United States Patent
Tanaka

(10) Patent No.: US 7,072,576 B2
(45) Date of Patent: Jul. 4, 2006

(54) INFORMATION STORAGE SYSTEM WITH INCREASED RELIABILITY FOR CONTINUOUS OPERATION, AND A RECORDING CONTROL METHOD

(75) Inventor: Hideaki Tanaka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1131 days.

(21) Appl. No.: 09/916,393

(22) Filed: Jul. 26, 2001

(65) Prior Publication Data

US 2002/0034379 A1   Mar. 21, 2002

(30) Foreign Application Priority Data

Aug. 4, 2000  (JP)  ............................ 2000-242757

(51) Int. Cl.
*H04N 5/85* (2006.01)

(52) U.S. Cl. ...................................... 386/125; 386/124
(58) Field of Classification Search ................. 386/46, 386/96, 204, 105, 106, 124, 125, 126, 45, 386/39

See application file for complete search history.

(56) References Cited

U.S. PATENT DOCUMENTS

| | | | | |
|---|---|---|---|---|
| 5,134,499 | A | * | 7/1992 | Sata et al. .................. 386/109 |
| 6,233,389 | B1 | | 5/2001 | Barton et al. |
| 2002/0007469 | A1 | * | 1/2002 | Taketa et al. .................. 714/6 |

FOREIGN PATENT DOCUMENTS

| | | |
|---|---|---|
| JP | 59-157870 | 9/1984 |
| JP | 08-190762 | 7/1996 |
| JP | 08-194585 | 7/1996 |
| JP | 09-251353 | 9/1997 |
| JP | 10-341389 | 12/1998 |

\* cited by examiner

*Primary Examiner*—Robert Chevalier
(74) *Attorney, Agent, or Firm*—Townsend and Townsend and Crew LLP

(57) ABSTRACT

The present invention increases reliability for continuous operation for an information storage device having a function of recording inputted information continuously. An information storage device has a plurality of recording device groups. The information storage device controls recording so that inputted information is sequentially recorded on each device, and changes states of the recording device groups other than the current device to stopped states. This permits operation time of each recording device to be decreased, which ensures reliability of the information storage device for continuous operation.

26 Claims, 5 Drawing Sheets

Response operation of each magnetic disk device in embodiment 1

INFORMATION STORAGE SYSTEM WITH INCREASED RELIABILITY FOR CONTINUOUS OPERATION, AND A RECORDING CONTROL METHOD

CROSS-REFERENCES TO RELATED APPLICATIONS

This application is related to and claims priority from Japanese Patent Application No. 2000-242757, filed on Aug. 4, 2000.

BACKGROUND OF THE INVENTION

The present invention relates to an information storage system used for continuous recording of inputted information such as video information and audio information, and more particularly, to an information storage system that is improved in reliability for long-term operation to a large extent.

In recent years, with the development of communications networks including networks and digital broadcasts, digital delivery of information is coming into wider use. In such circumstance, an information storage system for recording the delivered information is playing a more important role. As a total quantity of delivered information increases, and as a quantity of information delivered per unit hour increases, the information storage system is required to achieve both high-volume recording and high-speed recording. As a most suitable data storage unit for those purposes, a magnetic disk device is commonly used. Conventionally, the magnetic disk device has been mainly used as a computer's outboard recorder. However, taking advantage of the characteristics described above, the magnetic disk device is coming into wider use as a recording medium in the field of home entertainment products, handling video and audio information.

Continuous delivery of digital information permits the digital information to be used in the following manner: recording the information continuously within a range of storage capacity of the information recording system; and utilizing only a desired portion of the recorded information at any time. Taking a digital broadcast as an example, recording a desired channel continuously while watching only a desired portion becomes possible. For example, the following convenient operations become possible: playing back a missed portion again; interrupting a program currently being watched, while a user leaves in the middle temporarily, and continuing watching the program with a time lag afterward; and watching a broadcast that has finished a few hours ago.

In this manner, as regards a recording system that uses a magnetic disk as an information recording medium, the following technology is disclosed in Japanese Patent Application 10-341389A: in an information storage system comprising a magnetic disk device and a magnetic tape device, information recorded on the magnetic disk device is backed up on the magnetic tape device at given time intervals; and in the event that a failure of the magnetic disk device occurs, the information is played back from the magnetic tape device.

In addition, in Japanese Patent Application 09-251353A, another information storage system is disclosed. To be more specific, in a disk-array type information storage system comprising a plurality of magnetic disk devices, reliability is increased by: keeping a reserve magnetic disk device in a stopped state; and in the event that a failure of the other magnetic disk occurs, switching to the reserve magnetic disk.

In Japanese Patent Application 08-194585A, another information storage system is disclosed. To be more specific, in an information storage system for video-on-demand system comprising a plurality of magnetic disk devices, reliability is increased by: striping video information into a plurality of magnetic disk devices to distribute and record the information; recording the same video information, of which a compression ratio is increased, on another magnetic disk device for backup; and in the event that a failure of the former magnetic disk devices is detected during retrieving, playing back only the information, which is recorded on the failed magnetic disk device, from the backup magnetic disk device.

In Japanese Patent Application 59-157870A, the following technology is disclosed: in an information storage system comprising a plurality of floppy-disk devices, reliability of each floppy-disk device is increased by driving only a floppy-disk device, which performs recording/retrieving operation, while keeping the other floppy-disk devices in a stopped state.

In Japanese Patent Application 08-190762A, the following information storage system is disclosed: in a disk-array type information storage system comprising a plurality of magnetic disk devices, reliability is increased by stopping rotations of the magnetic disk devices when information is not recorded/played back.

Concerning an information recording system for continuous recording, the data storage unit is perfectly in a state of continuous operation. The continuous operation is severest in use for almost all of the data storage units, from the viewpoint of reliability. Using a case of a magnetic disk device as an example, problems of reliability in the state of the continuous operation will be described as below.

The magnetic disk device mainly comprises a disk as a recording medium, a head for recording and retrieving on the disk, and a control circuit for recording and retrieving. The magnetic disk device further comprises a disk-rotation mechanism, a head-movement mechanism (actuator), and the like. Current magnetic disk devices generally perform recording and retrieving while flying the head above the disk with a fine gap. Concerning the magnetic disk devices currently on the market, flying distances are mainly 30 nm or less, which are extremely short. Generally, decreased reliability of the magnetic disk device is mainly caused by a damage of the head or the disk, resulting from direct contact of the head with the disk or from indirect contact through contamination or the like inside the device. If the flying distance decreases, and as a period during which the head is flying above the disk becomes longer, risk of a head or disk damage rapidly increases. In the state of the continuous operation during which recording operation is always performed, the head if is always flying above the disk. Therefore, an increase in operation time risks reliability furthermore acceleratively (tribological reliability). Moreover, in the state of the continuous operation, components of the mechanisms including the disk-rotation mechanism, the head-movement mechanism, and the like described above are also forced to operate continuously. As a result, a mechanical factor including for example wear-out of a bearing and the like also risks reliability furthermore (mechanical reliability).

However, in each of the conventional examples, there are not disclosed a recording method and an information storage system, which are capable of: increasing reliability of the recording system itself for continuous recording; and thereby avoiding a failure of the recording system for a long time.

It is desirable to provide an information storage system and method for continuous recording, capable of ensuring high reliability even when operating the information storage system continuously for a long time There is a need to minimize energy consumption in such a system during continuous operation. There is a further need to reduce heat production in such a system which is likely to occur during continuous operation. It is also desirable to reduce noise in such a system which can occur as a result of continuous operation.

SUMMARY OF THE INVENTION

A method and system for continuous storage of information according to the present invention includes receiving the information and writing the information to a disk storage system. The disk storage system comprises plural storage devices. A controller is configured to write the received information to each of the storage devices. Each storage device has a temporary storage area to which the received information is written. In one aspect of the invention, the temporary areas are written to in ring-structured fashion. When the received information is to be written to a first one of the storage devices, it is started, while the other storage devices are in a stopped state.

When the capacity of the temporary area in the first storage device is exceeded, the received information is written to a second storage device. In accordance with the invention, the first storage device is placed in a stopped state and the second storage device is placed in an operating state.

DESCRIPTION OF THE SPECIFIC INVENTION

Figure 1:
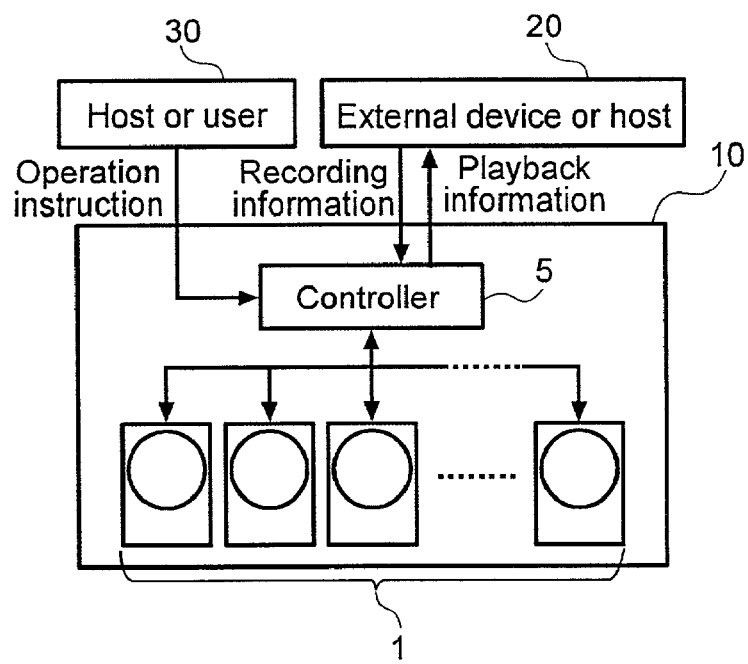
FIG. 1 is a diagram illustrating a schematic configuration of an information storage system according to the present invention.

Following is a brief overview of examples, illustrating various embodiments of the present invention and are not intended to limit the scope of the invention as set forth in the claims.

In one illustrative embodiment of the invention, an information storage system, according to the present invention, for attaining the above-mentioned objects decreases actual operation time of one data storage unit group by comprising a plurality of data storage unit groups internally; distributing and allocating a temporary storage area, on which continuous recording is always performed, to each data storage unit group as equally as possible; controlling the recording so that information is sequentially recorded on the temporary storage area in each of the data storage unit groups; and keeping the data storage unit group other than that currently being selected as a recording object in a stopped state. In accordance with the present invention, a stopped state refers generally to a state in which the storage unit is not able to read from or record information to the storage unit.

In an alternative illustrative embodiment of the invention, an information storage system comprises: a plurality of data storage unit groups, each of which comprises one or more data storage units; and a controller for controlling those data storage unit groups. The controller performs control as follows: distributing and allocating a temporary storage area used for a ring buffer function to the plurality of data storage unit groups; when recording continuously inputted information on the temporary storage area, selecting a data storage unit group used as a recording object, on which the inputted information is recorded, in such a manner that recording is sequentially performed on the plurality of data storage unit groups; and keeping the data storage unit group other than the selected data storage unit group in a stopped state. As will be explained below, the stopped state can be a state in which the read/write head of a disk drive type storage unit is in an unloaded condition.

In a further illustrative embodiment of the invention, a recording control method for an information recording system for attaining the above-mentioned object includes a recording control method of an information recording system comprising a plurality of data storage units for recording continuously inputted information, and a controller for controlling the data storage units. The recording control method comprises: a step of dividing and allocating a temporary storage area used for a ring buffer to the plurality of data storage units; a step of selecting a data storage unit used as an information recording object to record information so that the information is sequentially recorded on the temporary storage area allocated to the plurality of data storage units; and a step of controlling the data storage units so that the data storage unit other than the selected data storage unit is kept in a stopped state. As will be discussed below, the stopped state can be a state in which the spindle of the storage device is in a non-spinning condition.

The present invention will now be described in detail with reference to the drawings.

A schematic configuration of an information storage system of a first illustrative embodiment according to the present invention is shown in FIG. 1. An information storage system 10 according to the present invention comprises a plurality of data storage unit groups 1 for recording information, and a controller 5 for controlling recording/retrieving operation required for the data storage unit groups 1. Each of the data storage unit groups 1 comprises one or more data storage units. Any data storage unit may be used if it is a device capable of recording and playing back information such as a magnetic disk device and an optical disk device can be used. However, as described above, because of random access characteristics as well as high-volume and high-speed recording, the magnetic disk device is most suitable.

The controller 5 is connected to a higher-level host 30 for giving commands for recording and retrieving operation (for example, a computer, and the like). The controller 5 controls recording and retrieving of information on the data storage unit groups 1 according to the command from a host 30. If the information storage system 10 is used alone, the information storage system 10 may not be connected to the host 30. In this case, an command is directly given to the controller 5 using an operation panel or a remote control unit, or the like, which is attached to the information storage system 10 by a user. In FIG. 1, the external device or the host 20 is shown as a destination where information is given and received, and the host or the user 30 is shown as an operation command source. However, if the, the external device or the host 20 is the same as the host or the user 30Sometimes, host serves as external device or host 20 and host or user 30. If the information storage system 10 is used alone, a configuration may include the host or the user 30 as a means for giving commands such as the operation panel.

The controller 5 gives and receives recording/retrieving information to and from another external device or host 20. As an external device other than the host 20, which supplies recording information, there are, for example, Internet connection equipment, a tuner for digital broadcasts, and the like. As an external device on the side to which retrieving information is supplied, there are, for example, Internet connection equipment, a television monitor, a speaker, and the like. In FIG. 1, although the external device or the host 20 is shown separately from the information storage system 10, the information storage system 10 may contain a part of or all of its functions in itself. In addition, the above-mentioned example of the external device or the host 20 is one embodiment. Therefore, each of them may be connected to another external device in response to a kind of recording/retrieving information.

The information storage device according to the present invention has the following functions: allocating a part of or the whole of total storage capacity of the data storage unit groups 1 as a temporary storage area; using it as a ring buffer; and recording information continuously. A value of the temporary storage area's capacity may be fixed beforehand for the information storage system 10. However, the data storage unit groups 1 may change the value arbitrarily within a range of current remaining capacity as an upper limit according to an command from the host or the user 30. An aspect of the present invention consists in a method for allocating the temporary storage area to the plurality of the data storage unit groups 1 and in a recording control method for the temporary storage area.

Figure 2:
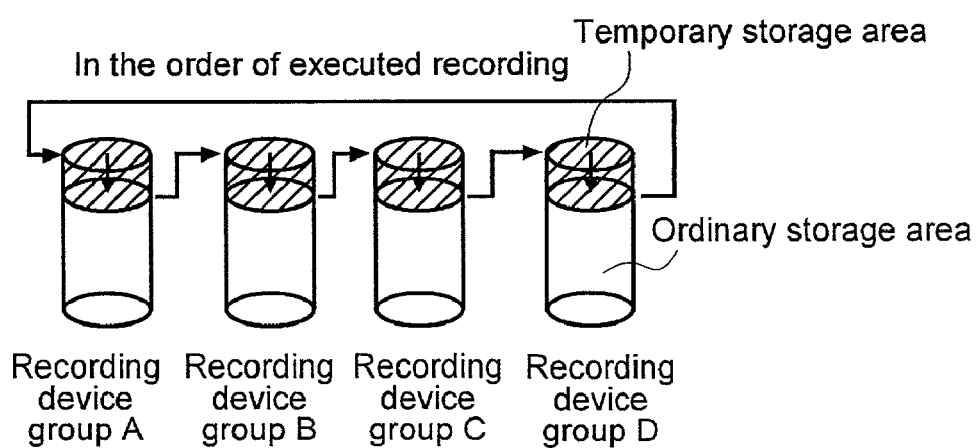
FIG. 2 is a schematic diagram illustrating a method for allocating a temporary storage area to data storage unit groups, and a recording control method.

FIG. 2 illustrates an example of a method for allocating the temporary storage area and the recording control method for the temporary storage area 102, according to one embodiment of the present invention. The information storage system always records the newest information within a range of the storage capacity of the temporary storage area by allocating at least a part of the storage capacity of the data storage unit equipped in the device as a temporary storage area; forming the temporary storage area virtually in a ring structure; and always overwriting and recording inputted information (hereinafter, the function of temporary storage like this is referred to as 'ring buffer' in the present invention because recording is performed in a ring structure).

Here, as an example, the following case is shown: four groups from A to D constitute the data storage unit groups, each of which comprises one data storage unit; capacity of the temporary storage area is a quarter of total storage capacity of the data storage unit groups A through D, and capacity of a remaining area 104 (hereinafter referred to as 'ordinary recording area') is three quarters of the total storage capacity of the data storage unit groups A through D.

The temporary storage area is allocated to the data storage unit groups A through D equally. A cylinder shown in FIG. 2 indicates the total capacity; and a hatched portion indicates a portion that is allocated as the temporary storage area. By the way, the ordinary storage area is an area for recording information, which should not be overwritten and erased by a ring buffer function, including information to be stored for a long time. Recording or playing back on the ordinary storage area is also performed under the control of the controller 5 according to commands from the host or the user.

In accordance with an illustrative example of the present invention, the controller 5 distributes and allocates the temporary storage area to the plurality of data storage unit groups, and sequentially records information on the temporary storage area, which has been allocated to each of the data storage unit groups 1, while the ring buffer function is executed. As an example, in FIG. 2, recording is performed in alphabetical order of the data storage unit groups A through D. After recording on the temporary storage area in the data storage unit group D is completed, recording returns to the data storage unit group A again. Then, latest information is overwritten to the temporary storage area in the data storage unit group A.

The information storage system 10 according to the present invention is characterized in that: when performing a series of the ring buffer function processes, the controller 5 changes states of the data storage unit groups other than the one currently being operated for recording information to stopped states. For example, if information is currently being recorded on the data storage unit group A, the states of the other data storage unit groups B through D are changed to a stopped state. As a result, even when the ring buffer function causes the information storage system 10 to be in a state of continuous operation and to be always in a state of recording operation, each of the data storage unit groups operates intermittently, which permits each of the data storage unit groups to decrease its actual operation time significantly, contributing to an increase in reliability. In addition, according to this method, changing states of the data storage unit groups that are not recording information to a stopped state provides an advantage that low power consumption and low noise can be achieved.

In an example shown in FIG. 2, the temporary storage area is distributed and allocated to four data storage unit groups, and the data storage unit groups other than that currently being operated for recording are kept in a stopped state. Therefore, actual operation time for each data storage unit group can be reduced to about a quarter of actual operation time measured when all of the data storage unit groups are being operated. A failure ratio of a data storage unit is not proportional to an increase in actual operation time. The failure occurrence rate generally increases accel-eratively as the actual operation time increases. Because of it, if the actual operation time can be reduced to a quarter, the failure occurrence rate can be reduced at least to a quarter or less, resulting in a remarkable increase in reliability.

If the host or the user 30 changes capacity of the temporary storage area in the information storage system 10, the controller 5 allocates the temporary storage area to the plurality of data storage unit groups 1 again. While the ring buffer function is executed, the reliability can be increased on an average by leveling actual operation time of the data storage unit groups 1 as a whole. Because of it, also at the time of reallocation, it is desirable that the temporary storage area is allocated to each of the data storage unit groups 1 as equally as possible.

However, if capacity of the temporary storage area is increased to be reset, there may be a case where the temporary storage area cannot be allocated equally. That is because information is already stored in an ordinary storage area in the specific data storage unit group 1, preventing the temporary storage area from being extended. In this case, capacity of the temporary storage area differs to some extent among the data storage unit groups, which does not ruin an effect of the present invention significantly. However, even in this case, it is possible to move at least a part of information, which is recorded on the ordinary storage area in the specific data storage unit group, to an ordinary storage area in another data storage unit group before allocating the temporary storage area to each of the data storage unit groups equally. In addition, when recording information on an ordinary storage area by means of ordinary recording operation other than the ring buffer function, for the purpose of leveling occupancy capacities for recording as equally as possible among the data storage unit groups, it is desirable that the controller 5 controls recording so that information is distributed and recorded on ordinary storage areas in all of the data storage unit group 1. This permits areas, which can be allocated as the temporary storage area, to be leveled among the data storage unit groups 1.

Figure 3:
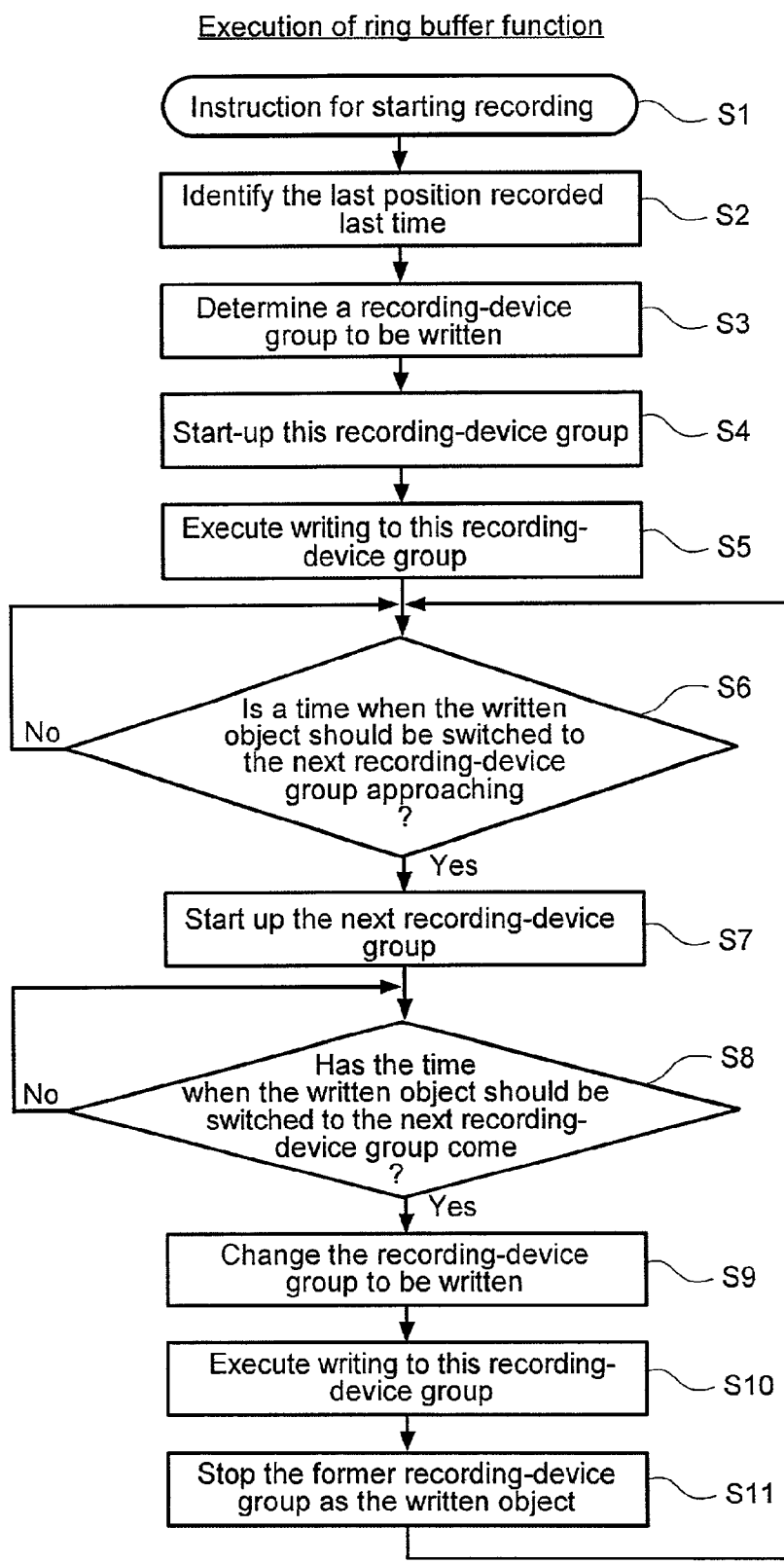
FIG. 3 is a diagram illustrating an operational flowchart in a case where continuous recording is performed on a temporary storage area.

FIG. 3 outlines a typical operational flowchart of the information storage system 10 according to the present invention when information recording is performed continuously by means of the ring buffer function.

After the host or the user 30 issues an command for starting recording (step S1). The controller 5 identifies the last recorded position (step S2) and its data storage unit group (for example, A) in a ring buffer, and designates as a recording start position the position immediately after the identified position (step S3). If the data storage unit group A is in a stopped state, starting up processing is executed (step S4), and recording is started (step S5). Next, the controller 5 monitors a remaining capacity of the temporary storage area, which has been allocated to the data storage unit group A during execution of recording. If the controller 5 judges that a time approaches when switching to the next data storage unit group B is required (step S6), the controller 5 performs starting-up processing of the next data storage unit group B (step S7). If the next storage unit group B does not have capacity for recording, or is disabled, or is otherwise not available for recording, then the next data storage unit is selected (e.g., group C).

The controller 5 judges whether or not the time has come when switching to the next data storage unit group B is required because of no remaining capacity of the temporary storage area in the data storage unit group A during execution of recording (step S8). When the time for switching has come, the controller 5 changes a recording object to the next data storage unit group B (step S9) and continues recording to the next data storage unit group (step S10). Once it is checked that the recording object has been switched, the controller 5 executes stop processing for the data storage unit group A (step S11), which was the last recording object. After that, recording on the temporary storage area in the plurality of data storage unit groups 1 is sequentially performed by repeating the above-mentioned operation.

Concerning the above-mentioned series of operations, it is desirable that start-up timing of the next data storage unit group B is judged with sufficient lead time, before switching the recording object, taking the following into consideration: time taken for start-up processing of the data storage unit group 1; or retry processing caused by a failure of the start-up processing; and the like. This prevents a dropout of information from occurring when switching the data storage unit group. Moreover, in the event that a failure of the data storage unit group is detected during start-up processing, it is desirable to exclude said data storage unit group used as the recording object from the ring buffer, and to continue recording using remaining data storage unit groups. This prevents dropout of information to be recorded.

In this case, however, capacity of the temporary storage area becomes small. If the remaining data storage unit groups have sufficient remaining capacity, the controller 5 may allocate the temporary storage area, which has been allocated to said data storage unit group where the failure occurred, to the remaining data storage unit groups. As a result, even if a failure occurs in a part of the data storage unit groups, capacity of the temporary storage area before the failure can be kept. In this connection, if a failure is detected in any of the data storage unit groups 1 as described above, it is desirable that the controller 5 reports the failure of the data storage unit to the host or the user 30.

While the ring buffer function is used, there is a probability that a retrieving command for the immediately preceding recorded information is issued. Taking digital broadcasts as an example, this includes a case where a missed portion is rewound to view it. In the series of operations described above, when the data storage unit group as the immediately preceding recording object is stopped immediately, it is required to execute start-up processing again for such retrieving command, which causes a delay time in retrieving of information. Because of it, considering processing after the recording object is switched, certain conditions for judgment may be provided; for example, stop processing for the immediately preceding data storage unit group may be delayed until a given period of time elapses. This period of time may be set in the information storage device beforehand. The period of time may also be a value that can be set arbitrarily by the host or the user.

Figure 4:
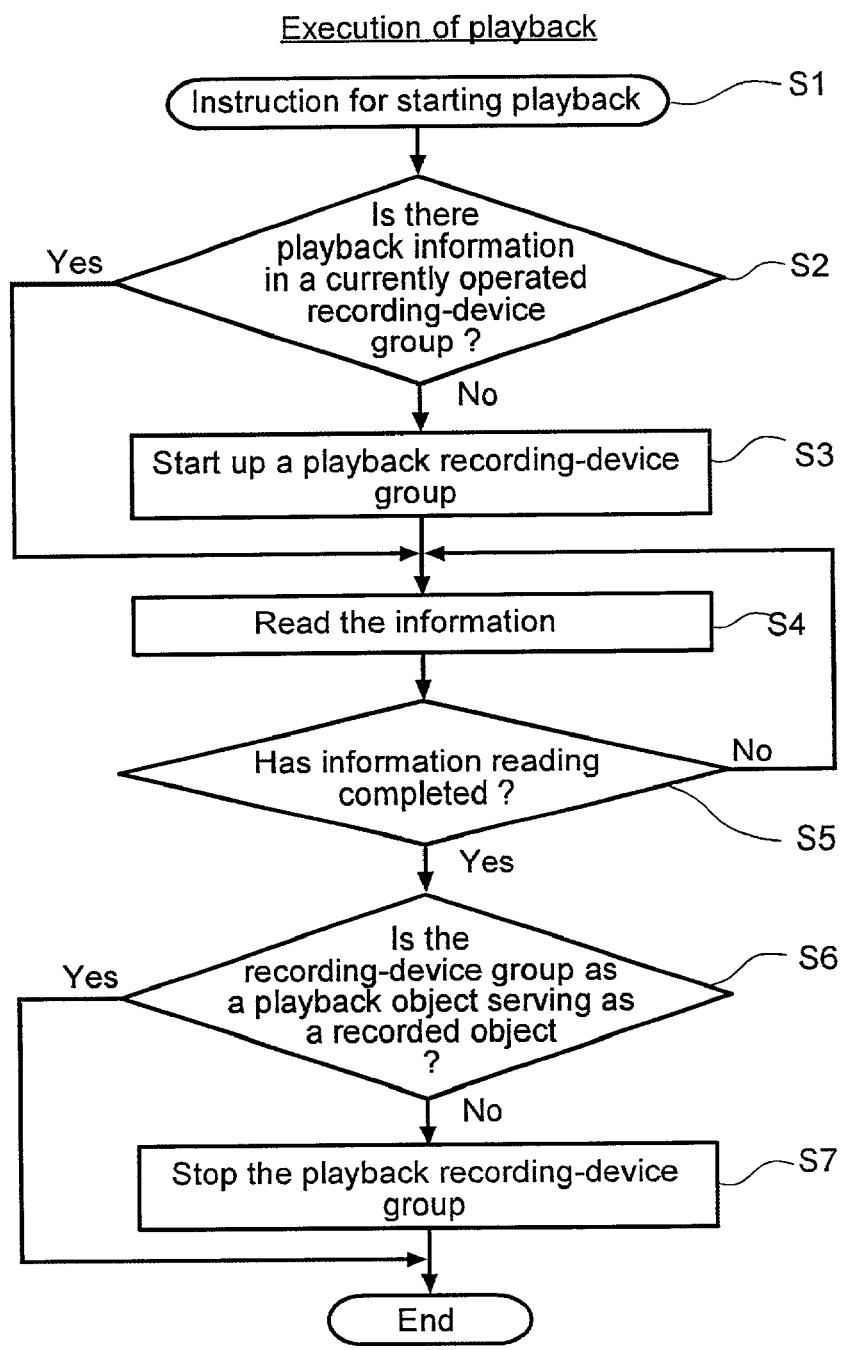
FIG. 4 is a diagram illustrating an operational flowchart in a case where retrieving of information is performed from a temporary storage area or an ordinary storage area.

On the other hand, FIG. 4 outlines a typical operational flowchart in a case where the host or the user 30 issues a retrieving command for information recorded on the temporary storage area or the ordinary storage area (step S1, shown in FIG. 4). When receiving an command for starting retrieving, the controller 5 judges whether or not there is retrieving information on the currently operated data storage unit group A (step 1 S2). If the data storage unit group A is in a stopped state, the controller 5 executes start-up processing of the data storage unit group A (step S3), and then starts retrieving of information (step S4). After the retrieving of information is completed (step S5), the controller judges whether or not the data storage unit group as a retrieving object (for example, A) is currently serving as a recording object of the ring buffer function (step S6). If the retrieving object is not the recording object, the controller 5 executes stop processing of the data storage unit group A (step S7). After that, the series of retrieving operations are completed.

In the series of retrieving operations described above, when the retrieving information is recorded across two or more data storage unit groups, as is the case with the above-mentioned recording operation, the controller 5 switches to the next data storage unit group as a recording object (for example, B) to continue the retrieving.

Figure 5:
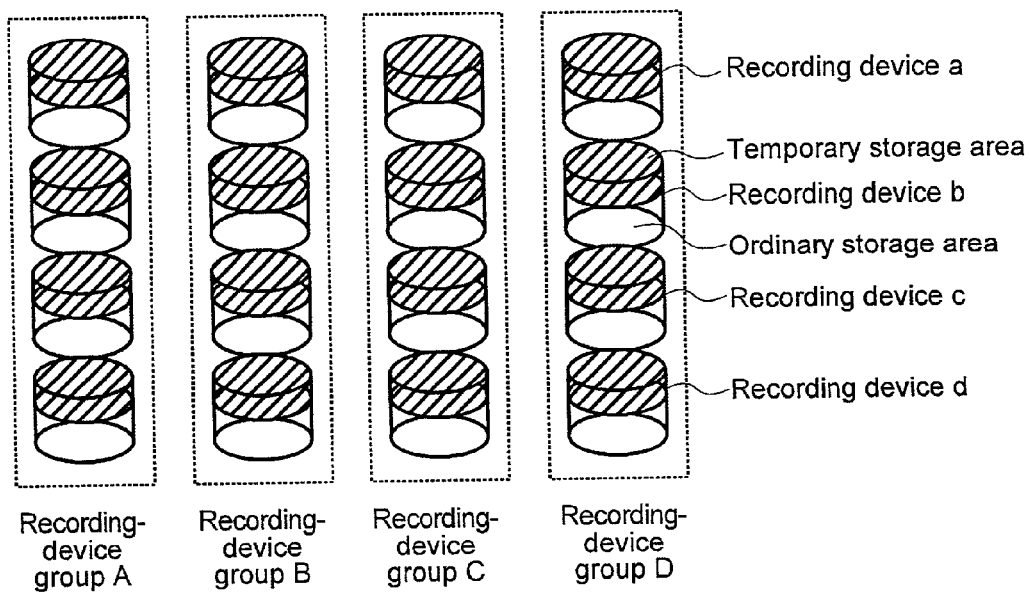
FIG. 5 is a diagram illustrating a case where a temporary data storage unit group comprises a plurality of storage devices.

In the above-mentioned FIG. 2, a case where each data storage unit in data storage unit group 1 consists of one data storage unit is shown. FIG. 5 is a diagram showing a second embodiment in which each data storage unit, in turn, comprises a plurality of data storage units.

In the case of this second embodiment, even if recording is executed in the same data storage unit group, a controller controls data storage units so that data storage units other than that actually being recorded are stopped. The control in this manner can decrease actual operation time of each data storage unit furthermore. In addition, it is desirable that the temporary storage area is distributed and allocated to each of the plurality of data storage units in each of the data storage unit groups to sequentially record information on each part of the temporary storage area. This permits actual operation time for each data storage unit to be leveled.

In this case, the plurality of data storage units in each of the data storage unit groups may form RAID (Redundant Array of Inexpensive Disks) configuration. There are several methods of the RAID. If a basic method is used, information is maintained by distributing and recording a piece of information on a plurality of magnetic disk devices; and in the event that a failure occurs in one of the magnetic disk devices, restoring original information from the information recorded on the other magnetic disks.

If the RAID is adopted, actual operation time for each data storage unit used as each individual temporary storage area cannot be reduced. However, actual operation time for each data storage unit group can be reduced. Moreover, because the RAID is adopted, even if a failure occurs in a portion of the data storage units, it becomes possible to restore information recorded on the data storage unit group.

If the RAID is not adopted, a ring buffer may be used in the following order: after a data storage unit a in the data storage unit group A, shifting to a data storage unit a in the data storage unit group B; and after recording on one data storage unit in all of the data storage unit groups is completed, recording information on a data storage unit b in the data storage unit group A. On the other hand, the following order is also possible: after the data storage unit a in the data storage unit group A, shifting to the data storage unit b in the data storage unit group A; and in this manner, after buffering information on all data storage units in the data storage unit group A, buffering information on a data storage unit in the data storage unit group B. In any order, it is desirable to level frequencies of using each data storage unit.

In addition, aside from the plurality of data storage unit groups (first data storage unit groups) to which a temporary storage area is allocated, the information storage system 10 according to the present invention may have a second data storage unit group comprising one or more data storage units to which a temporary storage area is not allocated. As is the case with the ordinary recording areas, which are provided in the first data storage unit groups described above, the second data storage unit group is used for: storing information to be stored for a long time; backup of information recorded on the temporary storage areas or the ordinary storage areas in the first data storage unit groups; and the like. The second data storage unit group has a function of complementing the ordinary storage areas in the first data storage unit groups. Therefore, the provision of the second data storage unit group permits reserved capacity of the ordinary storage area in each first data storage unit group to be decreased. As a result, capacity of the temporary storage area can be increased. To be more specific, the second data storage unit group has an advantage that a quantity of information, which can be recorded by the ring buffer function, can be increased.

For the above-mentioned use of the second data storage unit group, it is more desirable that its data storage unit body or its recording medium can be inserted and removed to and from the information storage system. This provides the following advantages: the information to be stored for a long time can be removed from the information storage system to store the information separately; exchange of information with the other information storage system becomes possible; a larger quantity of information can be stored; and the like. In this case, it is desirable that data storage units used for the second data storage unit group are constituted of at least one kind of a magnetic disk device, an optical disk device, a magneto-optical disk device, and a magnetic tape device. All of them have relatively large storage capacity, and their data storage unit bodies or their recording media can be inserted and removed to and from the information storage system. For example, if the magnetic disk device is used for the second data storage unit group, a removable-type magnetic disk device, of which a disk as a recording medium can be inserted and removed, may be used. If a fixed-type magnetic disk device, of which a disk is fixed, is used, the magnetic disk device can be inserted and removed by connecting a body of the magnetic disk device to the information storage system through a connector; and inserting and removing the magnetic disk device to and from the connector.

Figure 6:
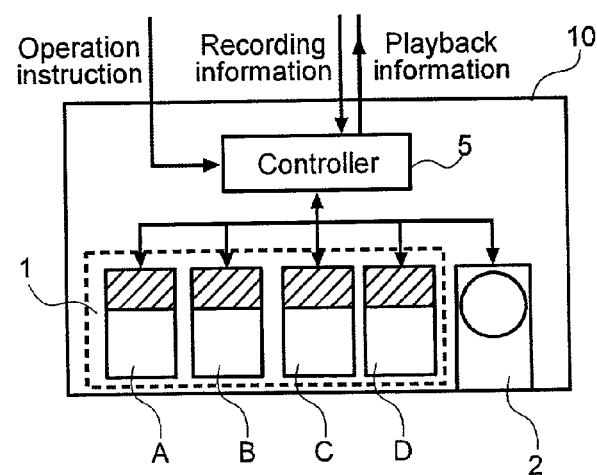
FIG. 6 is a diagram illustrating a schematic configuration of an information storage system according to the present invention.

Using the second embodiment shown in FIG. 6, the present invention will be described in more detail as below. By the way, the same reference numerals are given to the same members as those shown in FIG. 1.

For example, one 2.5-inch magnetic disk device having capacity of 20 GB constitutes one data storage unit group. In the same manner, four magnetic disk devices constitute four data storage unit groups A through D. The data storage unit groups A through D, and in addition to them, a controller 5 constitute an information storage system 10 having total storage capacity of 80 GB. The data storage unit groups A through D have a Load/Unload mechanism that retracts a head from a disk surface while recording/retrieving operation is not performed. Moreover, the information storage system 10 is equipped with one DVD (Digital Video Disk) device 2 as a second data storage unit group for storing information for a long time. The DVD device 2 is not used as a temporary storage area for the ring buffer function.

Using the information storage system 10, response operation of each magnetic disk device was measured when recording information continuously by means of the ring buffer function when changing the following conditions: capacity of the temporary storage area; an allocating method thereof; a recording execution method; presence or absence of stop processing for the magnetic disk devices that are non-recording objects; and the like. Table 1 shows a list of the conditions that have been examined.

TABLE 1

Detailed conditions of each Example

| | Total capacity | Distribution of temporary storage area | | Order of recording on temporary storage area in each magnetic disk device | Stop processing for magnetic disk device after shifting recording object |
|---|---|---|---|---|---|
| | | Allocation to each magnetic disk device | | | |
| | | A | B through D | | |
| Example 1 | 20 GB | 5 GB | 5 GB | A-B-C-D-A- | Stop magnetic disk device 10 minutes after recording is completed |
| Example 2 | 20 GB | 5 GB | 5 GB | A-B-C-D-A- | No processing |

TABLE 1-continued

Detailed conditions of each Example

|  | Distribution of temporary storage area | | Order of recording on | Stop processing for |
|---|---|---|---|---|
|  | Allocation to each magnetic disk device | | temporary storage area in each | magnetic disk device after shifting |
|  | Total capacity | A | B through D | magnetic disk device | recording object |
| Example 3 | 20 GB | 11 GB | 3 GB | A-B-C-D-A- | Stop magnetic disk device 10 minutes after recording is Completed |
| Example 4 | 20 GB | 20 GB | 0 GB | A | |
| Example 5 | 20 GB | 5 GB | 5 GB | A, B, C, D parallel | |
| Example 6 | 40 GB | 10 GB | 10 GB | A-B-C-D-A- | Stop magnetic disk device 10 minutes after recording is Completed |

The information recorded on the information storage system 10 is dummy data that simulates video information. The dummy data is supplied continuously at 0.55 MB/S, and recorded continuously on the temporary storage area for 100 hours. Under this condition, quantity of information is about 2 GB per hour. The response operation was measured by attaching a current probe to a power supply cable connected to each of the magnetic disk device A through D; monitoring how load/unload operation is executed, and checking whether or not a spindle motor is rotating to rotate a disk, by measuring a direct current value consumed by the magnetic disk device A trough D; and calculating a period of time during which a head is flying above the disk and stays as it is (head flying time), and a period of time during which the spindle rotates (rotation time), concerning each of the magnetic disk devices A through D.

Example 1 is set as follows: as is the case with FIG. 2, 5 GB is allocated for each of the magnetic disk devices A through D to constitute a temporary storage area having 20 GB; a magnetic disk device as a recording object is selected from among the magnetic disk devices A through D to execute recording; once the temporary storage area in this magnetic disk device becomes full, this magnetic disk device used as the recording object is switched to another from among the magnetic disk devices A through D; and in this manner, information is sequentially recorded on the magnetic disk devices A through D. Under the conditions described above, the temporary storage area rotates once in 10 hours. In other words, it is possible to record the latest information on the temporary storage area for 10 hours. Concerning the conditions, as stop processing for the magnetic disk devices A through D after shifting the recording object, the controller 5 is configured to issue a standby command to the magnetic disk devices A through D 10 minutes after recording operation is completed. In a standby state, a head of the magnetic disk devices A through D is in an unloaded state, the spindle motor for disk rotation is also in a stopped state, and excluding some circuits, the magnetic disk devices A through D are in a stopped state.

Figure 7:
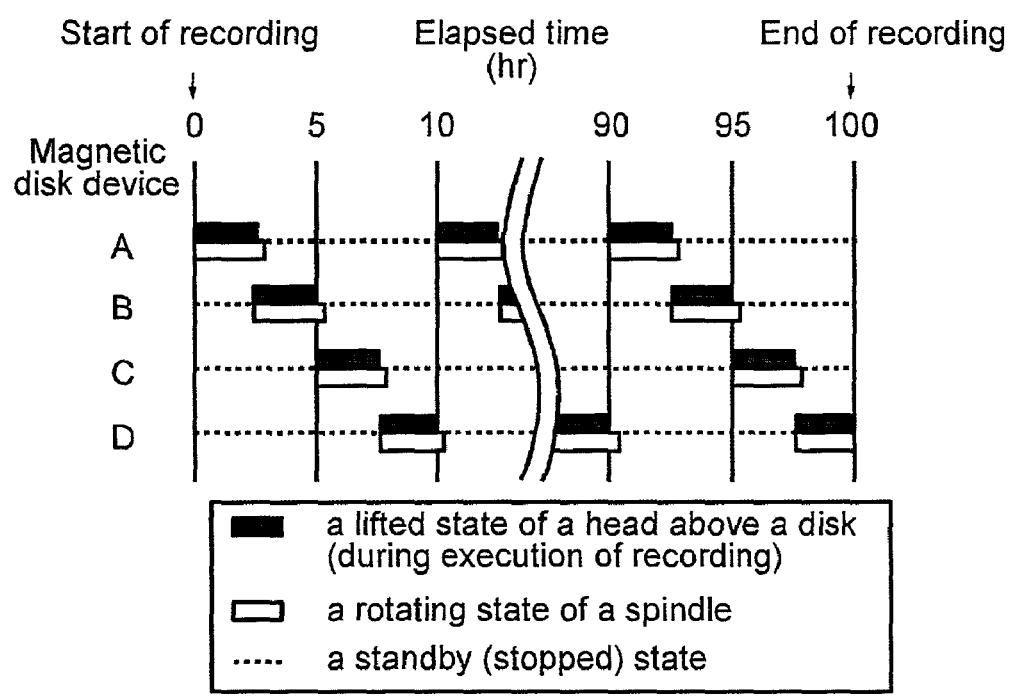
FIG. 7 is a diagram illustrating response operation of configured magnetic disk devices in a case where continuous recording is performed on a temporary storage area.

FIG. 7 shows measurement results of the response operation for elapsed time in the Example 1. It is found out that the magnetic disk devices A through D operate sequentially, and that the magnetic disk devices other than that being operated stop in a standby state. Flying time of the head in a continuous recording state for 100 hours was about 25 hours for all of the magnetic disk devices A through D, and rotation time of the spindle was about 27 hours. Because four magnetic disk devices A through D sequentially records information and the magnetic disk devices other than that being operated as a recording object are in a standby state, both of the flying time of the head and the rotation time of the spindle are reduced to about a quarter of total operation time. The reason why there is a slight difference between the two is that after the recording object is shifted to the next magnetic disk device, recording operation is not performed; as a result, the head was immediately unloaded by the load/unload mechanism; however, the controller does not issue a standby command for 10 minutes after that, which causes only the spindle to rotate for 10 minutes furthermore.

Example 2 is the same as the Example 1 except that the controller 5 is configured not to issue a standby command to the magnetic disk devices A through D. Flying time of the head in a continuous recording state for 100 hours in this Example was about 25 hours for all of the magnetic disk devices A through D, and rotation time of the spindle was 100 hours. As is the case with the Example 1, after the recording object is shifted to the next magnetic disk device, the head was immediately unloaded. However, because a standby command has not been issued, the spindle has never stopped.

Example 3 is the same as the Example 1 except that 11 GB is allocated to the magnetic disk device A and 3 GB is allocated to the magnetic disk devices B through D to constitute a whole temporary storage area having 20 GB. Flying time of the head in a continuous recording state for 100 hours in this Example was about 55 hours only for the magnetic disk device A, and was about 15 hours for all of the magnetic disk devices B through D. Rotation time of the spindle was about 57 hours only for the magnetic disk device A, and was about 17 hours for all of the magnetic disk devices B through D. In this Example, only the magnetic disk device A has a large space for the temporary storage area. Therefore, both of the flying time of the head and the rotation time of the spindle are longer than those of the other magnetic disk devices B through D.

Example 4 is the same as the Example 1 except that the whole of 20 GB is allocated only to the magnetic disk devices A to constitute a whole temporary storage area having 20 GB. In this Example, temporary storage is performed only on the magnetic disk device A. Flying time of the head in a continuous recording state for 100 hours in this Example was 100 hours only for the magnetic disk device A, and was 0 hours for all of the magnetic disk devices B through D. Rotation time of the spindle was 100 hours only for the magnetic disk device A, and was 0 hours for all of the magnetic disk devices B through D. In this Example, recording operation is concentrated on the magnetic disk device A. Therefore, both of the flying time of the head and the rotation time of the spindle are equal to the total operation time, and the other magnetic disk devices B through D have not been used at all.

Example 5 is the same as the Example 1 concerning allocation of the temporary storage area. However, recorded information, which is inputted, is distributed and recorded on the magnetic disk device A through D in parallel. To be more specific, the input information is distributed and recorded on the temporary storage area in each of the magnetic disk devices A through D by striping the input information for every 512 sectors (about 256 KB). When the last portion of the temporary storage area in each of the magnetic disk devices A through D is recorded, recording is continued from the first portion of this temporary storage area. The Example 5 is the same as the Example 1 except this recording method. Flying time of the head in a continuous recording state for 100 hours in this Example was 100 hours for all of the magnetic disk devices A through D, and rotation time of the spindle was also 100 hours. In this Example, recording of information on the temporary storage area in each of the magnetic disk devices always occurs at time intervals of 1 to 2 seconds or less. Because of it, the head was not unloaded, and the spindle's rotation was not stopped.

Example 6 is the same as the Example 1 except that 10 GB is allocated for each of the magnetic disk devices A through D to constitute a whole temporary storage area having 40 GB. In this Example, the temporary storage area rotates once in 20 hours. In other words, it is possible to record information on the temporary storage area for 20 hours. Flying time of the head in a continuous recording state for 100 hours in this Example was about 25 hours for all of the magnetic disk devices A through D, and rotation time of the spindle was 26 hours. Table 2 shows the results described above.

TABLE 2

Head's flying time and spindle's rotation time in each Example

| | Head's flying time | | Spindle's rotation time | |
|---|---|---|---|---|
| | Magnetic disk device A | Magnetic disk devices B through D | Magnetic disk device A | Magnetic disk devices B through D |
| Example 1 | 25 h | 25 h | 27 h | 27 h |
| Example 2 | 25 h | 25 h | 100 h | 100 h |
| Example 3 | 55 h | 15 h | 57 h | 17 h |
| Example 4 | 100 h | 0 h | 100 h | 0 h |
| Example 5 | 100 h | 100 h | 100 h | 100 h |
| Example 6 | 25 h | 25 h | 26 h | 26 h |

A difference between the Examples 1 and 2 exists only as to whether or not the magnetic disk devices other than that being operated as a recording object are stopped. In the Example 1 that performed stop processing, the rotation time of the spindle is significantly reduced in each of the magnetic disk devices, which enables an increase in the mechanical reliability. Concerning the flying time of the head, no difference is found between them, because in those Examples a magnetic disk device having the load/unload mechanism is used, and because when recording operation on each of the magnetic disk devices is completed, the head is retracted from the disk surface irrespective of whether or not a stop command is issued. If a magnetic disk device of a contact start stop (CSS) method that does not retract the head is used, the head is kept in a flying state above the disk as long as a stop command is not issued. Therefore, in the case of the Example 2 which does not perform stopping process, it can be expected that, both the rotation time of the spindle and the flying time of the head increases largely. Therefore, it is found that the stop processing is also important for the tribological reliability. Judging from the results described above, it is understood that stopping the magnetic disk devices other than that being operated as a recording object improves the tribological reliability and the mechanical reliability for an individual magnetic disk device to a large extent.

By the way, in the Example 1, the flying time of the head is shorter than the rotation time of the spindle. That is because, as described above, before stop processing for the magnetic disk device is performed, the load/unload mechanism retracts the head from the disk surface when recording operation is completed. If the magnetic disk device of the CSS method is used, the head is kept in a flying state above the disk until the stop processing is performed. As a result, the flying time of the head increases to some extent. Because of it, from the viewpoint of the tribological reliability, it is desirable to use the magnetic disk device having the load/unload mechanism.

In this Example, the stop processing for the magnetic disk device is performed by a standby command. However, from the viewpoint of reliability, important things are only whether or not the head is flying above the disk, and whether or not a mechanism portion including the spindle is in an operated state. Therefore, the same effect can be obtained by issuing a sleep command instead of issuing the standby command; or interrupting power supply to the magnetic disk device. However, when starting up again the magnetic disk device that has been stopped once, return time from a standby state is shorter. Therefore, for the purpose of improving responsibility, it is more desirable to use the standby command.

Next, the Examples 1, 3, and 4 are compared to each other. In those Examples, only allocated capacities for the plurality of the magnetic disk devices to constitute a whole temporary storage area are changed. It is found that the larger a specific magnetic disk device has allocated capacity, the more both of the flying time of the head and the rotation time of the spindle for the magnetic disk device increase. If the flying time of the head and the rotation time of the spindle are concentrated on a specific magnetic disk device, risk of a failure increases extraordinarily, which causes reliability of the information storage system to decrease totally. For this reason, for the purpose of increasing the tribological reliability and the mechanical reliability, it is important to allocate the temporary storage area to each of the magnetic disk device as equally as possible, and to level the flying time of the head and the rotation time of the spindle among the magnetic disk devices. In order to level the flying time of the head and the rotation time of the spindle among the magnetic disk devices, it is desirable that a maximum value of capacity as the partial temporary storage area allocated for each of the magnetic disk devices does not exceed twice as much as a minimum value of the capacity.

That is to say, if a total capacity of each magnetic disk device differs from another, allocation of the temporary storage area should not be determined based on a total-capacity ratio among the disk devices. It is preferable to determine capacity to be allocated so that each magnetic disk device has the same capacity used for the temporary storage area.

In the Examples 1 and 5, the temporary storage area is equally allocated to each of the magnetic disk device. The Examples, however, differ in a method for controlling recording on the temporary storage area. In the Example 5, in which inputted information is distributed and recorded on each of the magnetic disk devices, when the information is inputted continuously, recording operation is almost always performed on all of the magnetic disk devices. This results in the flying time of the head and the rotation time of the spindle, which are equivalent to total operation time of the information storage system. As compared with the Example 1, the tribological reliability and the mechanical reliability decrease considerably. In this manner, the method for controlling recording on the temporary storage area in each of the magnetic disk devices has a considerable effect on reliability of the information storage system as a whole. In the Example 1, one magnetic disk device as a recording object is selected among the magnetic disk devices, each of which has an allocated part of the temporary storage area, to execute recording. Once the temporary storage area of the selected magnetic disk device becomes full, the magnetic disk device as a recording object is switched to sequentially continue recording. In other words, it can be understood that, concerning the recording control method, it is very important not to perform recording operation on the magnetic disk devices other than that being operated as a recording object as possible.

Concerning all of the Examples 3, 4, and 5, when recording operation on the magnetic disk device is not executed, stop processing is performed. As described above, it is understood that in order to increase reliability of the information storage system as a whole, only one setting of performing stop processing for the magnetic disk devices other than that executing recording/retrieving operation is not sufficient as a measure; and that sufficient effect of increasing reliability can not be achieved unless a method for allocating a temporary storage area to each magnetic disk device and a method for controlling recording on the temporary storage area are provided properly.

Although the Examples 1 and 6 differ in total capacity of the temporary storage area and allocated capacity to each magnetic disk device, the temporary storage area is equally allocated to each magnetic storage area in both Examples. Both of the flying time of the head and the rotation time of the spindle are almost the same in both Examples. This indicates that a difference in total capacity of the temporary storage area has no significant effect on reliability.

As exemplified in the Example, four magnetic disk devices constitute the information storage system. The more a number of magnetic disk devices increases, the more the flying time of the head and the rotation time of the spindle, which have considerable if effects on reliability, can be reduced. Taking a case like the Example 1 in consideration, actual operation time of each magnetic disk device is substantially inversely proportional to the number of equipped magnetic disk devices. Therefore, from the viewpoint of increasing reliability, it is desirable to equip more magnetic disk devices. However, concerning how many magnetic disk devices should be equipped, it is desirable to determine it from the viewpoint of total storage capacity required for the information storage system, individual storage capacities of applicable magnetic disk devices, specifications of reliability, and costs. However, if the total storage capacity of the information storage system is determined, it is more desirable, from the viewpoint of reliability, to equip many magnetic disk devices having small capacity as shown in FIG. 5 rather than to equip a few magnetic disk devices having large capacity.

According to the present invention, in a continuous-operation-type information storage system, on which recording is always performed, it is possible to provide an information storage system having increased tribological reliability for long-term operation, and its recording control method by decreasing actual operation time of individual built-in storage devices. A consequence of the invention is that energy consumption by the system is reduces. In addition, the heat generated by the system during operation is reduced. Also, there is a reduction in the noise generated by the system.

What is claimed is:

1. A method of storing information in a data storage system for continuous recording comprising a plurality of storage devices, each of which includes both a temporary storage area and an ordinary recording area, the method comprising:
   receiving said information;
   writing a first part of said information to a temporary storage area of a first storage device among said storage devices;
   during said writing to said first storage device, placing a second storage device among said storage devices in said plurality of storage devices in a state where it is ready to record a second part of said information;
   writing said second part of said information to a temporary storage area of said second storage device, including ceasing writing of said first part of said information to said first storage device; and
   subsequent to commencement of writing said second part of said information to said second storage device, placing said first storage device in a stopped state,
   whereby said information is continuously recorded to said temporary storage areas.

2. The method of claim 1 further including determining whether said second storage device can be placed in a state where it is ready to record said second part of said information and if not, then:
   during said writing to said first storage device, placing a third storage device among said storage devices in a state where it is ready to record said second part of said information;
   writing said second part of said information to said third storage device when it is ready to record said second part of said information, including ceasing writing of said first part of said information to said first storage device; and
   subsequent to commencement of writing said second part of said information to said third storage device, placing said first storage device in a stopped state.

3. The method of claim 1 wherein said stopped state is a state in which a read write head of said first storage device is in an unloaded position.

4. The method of claim 1 wherein said stopped state is a state in which a rotating member of said first storage device is not rotating.

5. The method of claim 1 wherein said storage devices include magnetic disk devices or optical disk devices.

6. The method of claim 1 wherein said storage devices are written in a ring structure manner wherein after writing to a last one of said storage devices, returning to said first storage device and overwriting information previously written thereto.

7. The method of claim 1 further including recording to a third storage device that is separate from said plurality of storage devices, said recording including writing said received information to said third storage device or copying information stored in said first or second storage devices to said third storage device.

8. The method of claim 7 wherein said third storage device is removable.

9. The method of claim 7 wherein said third storage device is a magnetic disk, an optical disk, a magneto-optical disk, or a magnetic tape drive.

10. An information storage system for continuous recording comprising:

a plurality of storage devices, each of which includes both a temporary storage area and an ordinary recording area; and a controller operatively coupled to said storage devices and configured to record information on said storage devices, said controller configured to perform first write operations on a first part of said information to a temporary area of a first storage device of said storage devices, said controller configured to perform second write operations of a second part of said information to a temporary area of a second storage device of said storage devices, including, during said first write operations, placing said second storage device in a state where it is ready to record information, said controller further configured to cease said first writing operations upon commencing said second write operations, said controller further configured to place said first storage device in a stopped state after commencing said second write operations, said stopped state, whereby said information is continuously recorded to said temporary storage areas.

11. The system of claim 10 wherein said controller is further configured to determine whether said second storage device can be placed in a state where it is ready to record said second part of said information and if not, then to perform second write operations of said second part of said information to a third storage device of said storage devices, including, during said first write operations, placing said third storage device in a state where it is ready to record said second part of said information, and to place said first storage device in a stopped state after commencing said second write operations to said third storage device.

12. The system of claim 10 wherein each of said storage devices includes a read write head, said stopped state being a state in which said read write head is in an unloaded position.

13. The system of claim 10 wherein each of said storage devices includes a rotating member, said stopped state being a state in which said rotating member is not rotating.

14. The system of claim 10 wherein said storage devices are magnetic disk devices or optical disk devices.

15. The system of claim 10 wherein said storage devices are arranged in a ring buffer configuration, such that said information is written successively to each of said first through $N^{th}$ storage devices, where N is the number of said storage devices, and upon writing to said $N^{th}$ storage device, returning to said first storage device in a subsequent write operation.

16. The system of claim 10 further including a third storage device that is separate from said plurality of storage devices, said controller further configured to write information to said third storage device, said information being said information to be recorded or information copied from one of said storage devices.

17. The system of claim 16 wherein said third storage device is a removable medium.

18. The system of claim 16 wherein said third storage device is a magnetic disk, an optical disk, a magneto-optical disk, or a magnetic tape drive.

19. An audio-visual information storage system comprising:

a plurality of storage devices; and a controller operatively coupled to said storage devices, said controller configured to receive audio-visual information containing audio content, visual content, or audio-visual content to be stored in said storage devices, said controller configured to perform first write operations of said audio-visual information to a first of said storage devices, said controller configured to perform second write operations of said audio-visual information to a second of said storage devices, including, during said first write operations, placing said second storage device in a state ready to record said audio-visual information, said controller configured to place said first storage device in a stopped state subsequent to commencement of said second write operations, said controller configured to read out audio-visual information contained in one of said storage devices during said first or second writing operations, including placing said one of said storage devices in a state so that said audio-visual information can be read therefrom, said storage devices further including a third storage device that is separate from said plurality of storage devices, said controller further configured to write said audio-visual information to said third storage device, said audio-visual information being said information to be recorded or information copied from said storage devices.

20. The system of claim 19 wherein each of said storage devices includes a read write head, said stopped state is a state in which said read write head is in an unloaded position.

21. The system of claim 19 wherein each of said storage devices includes a rotating member, said stopped state is a state in which said rotating member is not rotating.

22. The system of claim 19 wherein each of said storage devices includes a rotating member, said stopped state is a state in which said rotating member is not rotating.

23. The system of claim 19 wherein said storage devices are magnetic disk devices or optical disk devices.

24. The system of claim 19 wherein said storage devices are arranged in a ring buffer configuration, such that said audio-visual information is written successively to each of said first through $N^{th}$ storage devices, where N is the number of said storage devices, and upon writing to said $N^{th}$ storage device, returning to said first storage device in a subsequent write operation.

25. The system of claim 19 wherein said third storage device is a removable medium.

26. The system of claim 19 wherein said third storage device is a magnetic disk, an optical disk, a magneto-optical disk, or a magnetic tape drive.

* * * * *